Feb. 13, 1934. J. R. ZWICKL 1,946,775
WEIGHING SCALE
Filed Dec. 11, 1931
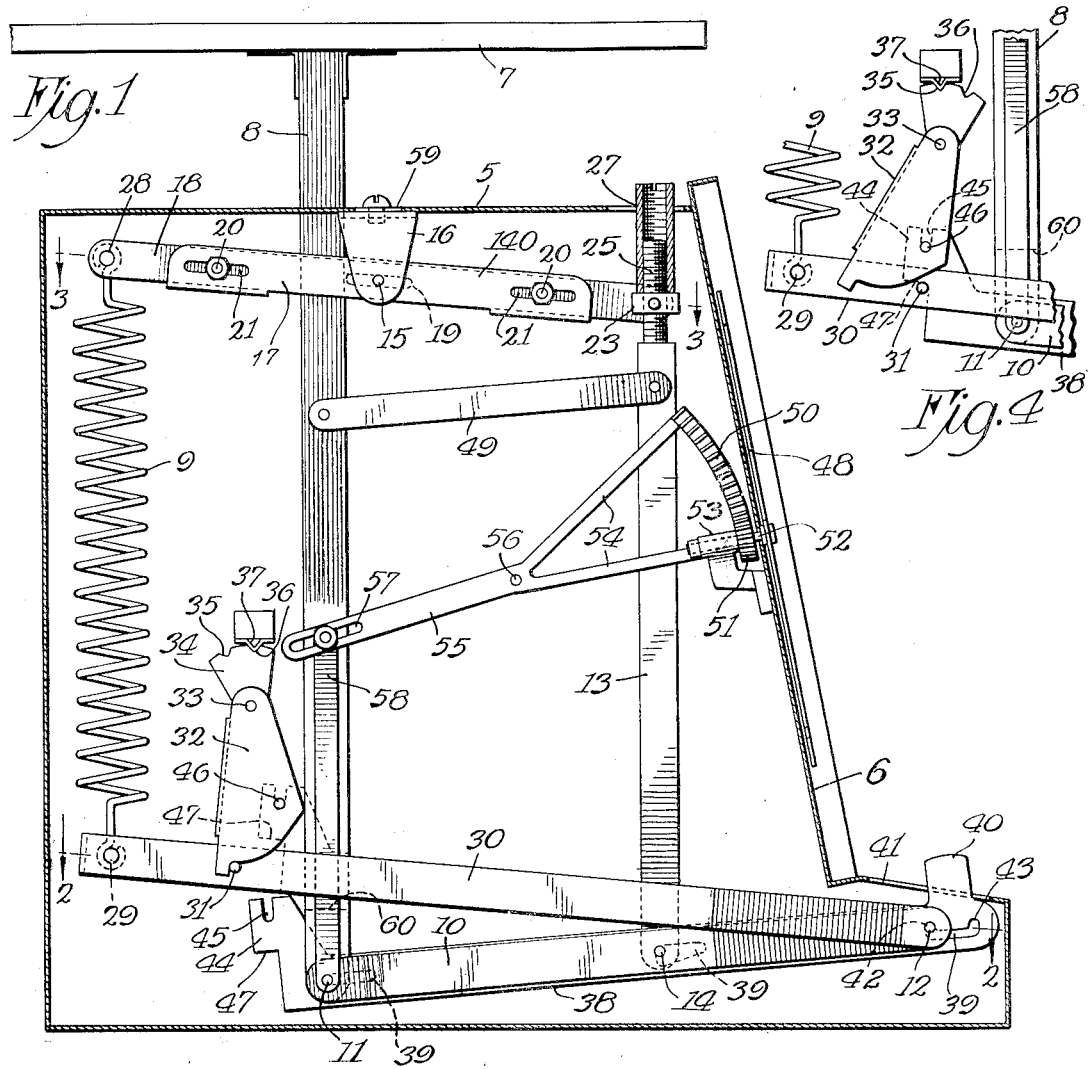
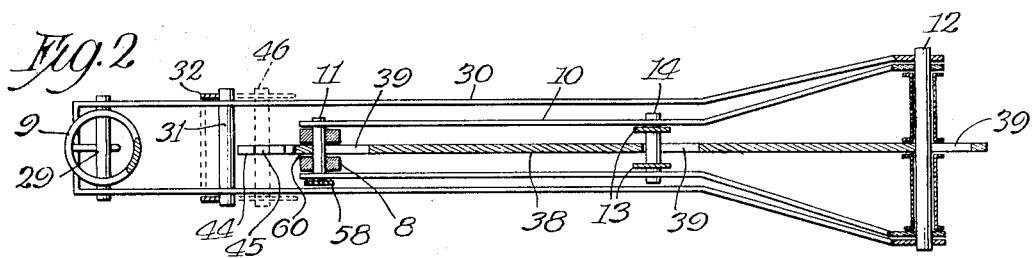
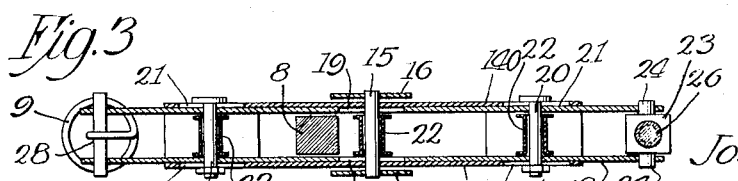
Inventor
Joseph R. Zwickl Patented Feb. 13, 1934

1,946,775

UNITED STATES PATENT OFFICE 1,946,775

WEIGHING SCALE

Joseph R. Zwickl, Chicago, Ill.

Application December 11, 1931
Serial No. 580,257

10 Claims. (Cl. 265—68)

This invention relates to weighing scales, and has for its main object the provision of a weighing scale which is adapted to weigh with equal accuracy, articles or loads of small weight, for example, one or two pounds and under, and articles or loads of larger weight, for example over one or two pounds.

It has been found that most scales which are designed for weighing quantities up to say 16 or 24 pounds, for example, ordinary kitchen scales, are not accurate for weights under a certain amount, for example, one pound, while on the other hand, they may be reasonably accurate for larger weights. By the invention herein disclosed an adjustable scale structure is provided wherein the figures of the scale dial may indicate either large units of weight measurement such as one pound, or a sub-division of one pound, such as one ounce.

Other objects and advantages of the invention will be understood by reference to the following specification and accompanying drawing in which the invention is illustrated in connection with a typical kitchen scale.

In the drawing:—

Fig. 1 is a cross-section on a vertical plane through a scale embodying the invention.

Figs. 2 and 3 are sections on the lines 2—2 and 3—3 respectively of Fig. 1, and

Fig. 4 is an illustration of certain parts appearing in Fig. 1 but showing a changed position of such parts.

Referring now to the drawing, the scale herein disclosed includes a housing or casing 5 which is provided with a graduated dial or scale on the inclined front face element 6. The dial may be of any conventional form, graduated to indicate one to sixteen pounds and fractions thereof. Other ranges of weight may also be provided if desired. A platform 7 mounted on the upper end of a post 8 serves to receive the article or load to be weighed.

Within the casing 5 there is a system of levers which transmits downward movement of the post 8 to a coil spring 9. The coil spring 9 constitutes counterbalancing means for the platform and its load. The system of leverage referred to includes what might be called a primary and a secondary leverage system. The primary system includes an arm 10 pivoted at one end to the lower end of the post 8 as indicated at 11. The other end of the arm 10 is provided with a fixed pivotal mounting as indicated at 12. A link 13 is pivoted at its lower end as indicated at 14 to the arm 10 intermediate its ends.

A lever 140 is mounted intermediate its ends for pivotal movement on a normally fixed pivot or fulcrum 15. The fulcrum 15 is carried by a suitable bracket 16 which may be adjustably mounted in the casing 5 in any suitable manner for a purpose which will presently appear.

The lever 140 is preferably constructed so that it may be adjusted to vary its length on opposite sides of the fulcrum 15. One such construction may include an outer or sleeve member 17 provided with suitable bearing openings for receiving the fulcrum pin 15, and an inner member 18 provided with elongated slots such as 19 for receiving the fulcrum pin 15. The inner member 18 is also provided with suitable openings for receiving clamping screws such as 20 which pass through elongated slots 21 in the outer member. It will be observed that the inner member 18 of the lever 140 may be adjusted longitudinally relative to the fulcrum pin 15 and the outer member 17, and locked in adjusted position by means of the clamping screws 20. Suitable spacing sleeves such as indicated at 22 may be provided for preventing bending of the lever by too tight clamping of the screws 20.

The lever 140 is connected to the upper end of the link 13 preferably by an adjustable means which in this instance includes a journal block 23 having trunnions 24 which project through suitable openings in the opposite side portions of the lever member 18. The link 13 is provided at its upper end with a screw threaded stem 25 which fits slidably through an opening 26 in the journal block 23. An elongated nut 27 engages the projecting end of the screw 25, and constitutes means for adjusting the length of link 13 and the initial tension of the spring 9. The other end of the lever 140 is connected to the upper end of the coil spring as indicated at 28.

The lower end of the spring 9 is, for one purpose, held in normally fixed position by being connected as indicated at 29 to the free end of a lever 30 which, at its opposite end is fixedly mounted for pivotal movement on the pivot 12. A pin 31 carried by the lever 30 engages a stop member 32 which is pivoted as indicated at 33 on a fixed pivot. The stop member is provided with a fan-shaped tail portion 34 which has a pair of notches 35 and 36 respectively for cooperating with a yieldable element 37. It will be understood that the yieldable element 37 offers a slight resistance to swinging movement of the stop member 32 and thus maintains the stop member in its adjusted position. So far as the primary leverage system is concerned, the lever 30 constitutes merely an anchor for the lower end of the coil spring 9. No movement is imparted to the lever 30 when weighing is done through the primary leverage system.

The secondary leverage system includes all of the above described primary leverage system with the addition of the lever 30 as a moving or working part. For incorporating the lever 30 in the leverage system, a movable bar 38 is associated with the arm 10. The bar 38 is provided with elongated slots 39 for receiving the pivot pins 11, 14 and 12, whereby the bar 38 is longitudinally adjustably mounted on the arm 10. It will be observed that the bar 38, because of its connection with the arm 10, moves in unison therewith.

At its front end, the bar 38 is provided with a finger piece 40 for facilitating manual adjustment of the bar, this finger piece projecting outwardly through a slot 41 in the casing 5. The slot 39 in the front end of the bar is provided with offset end portions 42 and 43 which are adapted to receive the pivot pin 12 to hold the bar in adjusted position. At its opposite or inner end, the bar 38 is provided with an upwardly offset portion 44 which is provided with a notch 45 for engaging a cross pin 46 carried by the stop member 32. A shoulder 47 is also formed for engaging the pin 31 of the lever 30. The inner end of the bar 38 extends through a slot 60 in the lower end of the post 8.

As shown in Fig. 1, the bar 38 is adjusted to such a position that downward movement of the platform 7 and post 8 effect only the primary system of leverage, under which condition the lever 30 remains stationary and constitutes merely an anchor for the lower end of the coil spring 9. Under this condition, the scale is particularly adapted to weigh small quantities, for example one pound or less, the figures on the dial or scale 6 then representing ounces and the graduations intermediate the main or unit graduations indicating fractions thereof, for instance, drams.

When it is desired to weigh larger quantities, for example, quantities in pounds to the limit of the scale, the bar 38 is adjusted to cause the pin 12 to seat in the offset slot end 43. Such adjustment should, of course, be effected when the platform is unloaded and in up position, at which time the notch 45 in the inner end of the bar 38 will engage the pin 46 of the stop 32, as indicated in broken lines in Fig. 1. It will be seen then that inward adjustment of the bar 38 swings the stop 32 rearwardly, substantially to the position indicated in Fig. 4 and that the shoulder 47 of the bar overlies the pin 31 of the lever 30.

By comparison of Figs. 1 and 4, it will be seen that when the stop 32 is swung rearwardly to the position of Fig. 4, the lever 30 is permitted to rise under the influence of the spring 9 until the pin 31 engages the shoulder 47. Such elevation of the lever 30 and incidental retraction of the spring 9 reduces the initial tension of the spring to compensate for the added leverage, caused by engagement of the lever 30 for carrying the load. Such compensation serves to cause the indicating hand 48 to maintain its proper position relative to a zero point in the scale dial in spite of the change in leverage.

If desired, the scale may be used with the stop element 32 fixedly mounted. In such a case, the spring tension incident to the dead weight of the platform 7 and column 8, transmitted through the primary leverage system, operates to maintain the lever 30 in engagement with the stop, and hence in the same initial position for both leverage systems. When the secondary leverage system is in use for weighing larger loads, it will be evident that because of the increased leverage through which the spring resists downward movement of the platform, the said platform will not begin to descend under load until enough load is placed upon the platform, or otherwise applied, to compensate for or equalize the resistance of the spring through the lever 30.

A special weight element may be provided for effecting the desired compensation and such an element may be placed on the platform or otherwise applied before actual weighing of a large load starts. The scale graduations which indicate ounces may then indicate pounds.

The provision of an extra or special weight element is not, at this time, considered desirable. However, an entirely satisfactory arrangement may be obtained by providing the platform 7 and post 8 of such a weight that the zero point of the scale for small loads (weighed through the primary leverage system) will coincide with the indication for the maximum capacity in the small range when the same is balanced through the secondary leverage system. For example, if the maximum capacity of the small range scale is one pound, the zero point of the small range scale will constitute the one pound point of the large weight scale. Since the leverage system of the scale is so designed that the extent of movement of the indicator for one pound is the same as that for one ounce, it will be evident that the pound indicating numerals will be advanced by one relative to the ounce indicating numerals. Hence, a separate set of scale numbers for indicating pounds, and the set of scale numbers for indicating ounces will preferably be associated with the same graduations but in relatively offset relation. When the scale is arranged in this manner, a load may first be treated as a small load and subjected to balancing through the primary leverage system. In the event that the load is found to be too large for weighing on the ounce or small weight scale, the secondary leverage system may be connected and the larger weight scale read.

A link 49 extends between the post 8 and the upwardly extending link 13, this link being of substantially the same length as the distance between the pivots 11 and 14 so that the post 8 and link 13 are maintained in substantially parallel relation.

The lever 140 moves the same amount, and in the same direction, for each unit of the dial, regardless of engagement or disengagement of the lever 30. The lever 30, when incorporated in the leverage system, stretches the spring downwardly while the lever 140 always stretches the spring upwardly and in this way, each of the lever systems, connected to the same spring, carries its proportionate part of the load.

For actuating the indicator hand 48, a segment 50 is provided. This segment meshes with a pinion 51 carried on the shaft 52 of the indicator hand, the shaft 52 being journaled in a suitable bearing bracket 53 which is suitably supported, for example, by being secured to the back of the dial front 6. The segment 50 is carried by the forked arms 54 which have formed integral therewith an arm 55. The arm member 54—55 is pivoted on a fixed pivot as indicated at 56, and the rear end of the arm 55 is slotted as indicated at 57 to adjustably receive one end of a link 58. The other end of the link 58 is connected to the pivot 11. It will be apparent that downward movement of the arm 10 under the influence of a weight on the platform will be transmitted through the link 58 to the segment 50 and thereby cause rotation of the indicator hand 48. The adjustable connection between the arm 55 and link 58 serves to permit adjustment of the length of the lever arm between the fulcrum 56 and the link connection for controlling the extent of movement imparted to the indicator hand 48 for a given extent of stretching of the spring 9. If the spring 9 happens to be a weak spring, less movement should, of course, be imparted to the indicator hand 48 for a given degree of stretching, in which case the lever length between the fulcrum 56 and link connection should be lengthened. A stronger spring would, of course, require shortening of the lever length in order to increase the extent of movement of the hand 48.

The indicator hand 48 may be adjusted to its proper zero position by turning the adjusting nut 27 to shorten or lengthen the link 13. If the link 13 is shortened, the arm 10 will, of course, be elevated with the result that, in the disclosed arrangement, the indicator hand 48 will be adjusted in a clockwise direction. If on the other hand, the link 13 is lengthened, the indicator hand 48 would be adjusted in a counterclockwise direction.

Downward movement of the platform and post for a given distance always causes the same extent of movement of the indicator hand since the latter is actuated through its fixed connections to the post.

In order that the downward movement of the platform may be the same for a large and a small unit of weight, it is important that the various lever lengths be accurately made so as to transmit certain proportions of the load through each leverage system when large loads are weighed. The proper lever lengths may be mathematically determined by those skilled in the art.

The proportions of the weighed load which are transmitted to the spring by the primary leverage system and the leverage added thereto to form the secondary leverage system, are of course, dependent upon the lengths of the various levers. In the event that the various lever lengths are not accurately made, it may be found that, for example, one pound weighed through the secondary leverage system would cause the indicator 48 to move a given distance, and that one ounce weighed through the primary system would cause the indicater to move either more or less than said given distance.

Under some conditions it might be feasible to provide separate scales on the dial to respectively show the weight of large and small loads but for most purposes, it appears to be more desirable to be able to read the weight in large or small units of weight measure directly on a single scale.

Where manufacturing methods are such that levers of predetermined lengths may be accurately produced, it is not necessary to provide for adjustment thereof, but where the manufacturing methods are not capable of such accurate production, it is preferable to provide the above described adjustable lever 140. By its adjustment, proper compensation may be made for such inaccuracies as may occur in the production of the various levers.

Under ordinary circumstances, the extent of adjustment of the lever 140 would be so slight that verticality of the link 13 and post 8 would not be materially affected. However, in the event of an extreme case, wherein the post 8 and the link 13 might be caused to assume a noticeably, inclined position, realignment of the post 8 and the parts connected therewith, may be effected by adjusting the fulcrum bracket 16 along the slot 59. Such adjustment of the bracket 16 will, of course, have no effect on the length of the lever 140 on opposite sides of the fulcrum 15, but will serve the purpose of adjusting the post 8 to vertical position so that the platform 7 will be in horizontal position.

By the above described arrangement, a simple and inexpensive scale is provided which will accurately weigh very small quantities as well as larger quantities, The units of weight measure may be ounces and pounds respectively for small and large quantities, and the arrangement is preferably such that the numerals designating pounds, when the scale is used for weighing heavy quantities, will designate ounces when the scale is set for weighing smaller quantities. Thus, direct reading may be had in either pounds or ounces.

The fixed pivots 12, 15, 33 and 56 may be carried by the housing 5 or, if desired, a suitable framework may be provided within the casing for supporting said pivots. Such a framework might also include a bearing for the shaft 52 in lieu of the described casing-mounted bearing 53. For the sake of clarity in the present disclosure, I have treated the pivots 12, 33 and 56 as being pins extending across the casing and supported thereby.

In the above explanation, I have referred to pounds and ounces as the unit of measure merely to explain one application of the invention, but it will be understood that other units and other proportions may be used. The scale may be arranged to weigh one pound or one ounce for the same movement of the indicator as above contemplated, or it may be arranged to weigh one pound or two ounces (or other proportions) with the same extent of platform and indicator movement. Changes may be made in the described structure without departing from the spirit of the invention, the scope of which should be determined by reference to the following claims, the same being construed as broadly as possible consistent with the state of the art.

I claim as my invention:—

1. In a weighing device of the class described, the combination of a platform, a coil spring for yieldably supporting said platform, a post depending from said platform, lever means connecting said post to one end of said spring for applying stretching force to one end of said spring as an incident to downward movement of the platform; a lever connected to the other end of said spring, and selectively operable means for connecting said last mentioned lever to said post.

2. In a weighing device of the class described, the combination of a platform, a graduated scale, an indicator cooperating with said scale to indicate the weight of a load placed on said platform, a coil spring for yieldably supporting said platform, lever means connecting said platform to one end of said spring for applying stretching force thereto, a lever connected to the other end of said spring, selectively operable means for connecting said last mentioned lever to said platform to transmit additional stretching force to said spring by downward movement of said platform, said lever means and said lever being so proportioned that said scale graduations are operative to indicate the weight of a load on the platform selectively in either one of a pair of predetermined units of weight.

3. In a weighing device of the class described, the combination of a platform, means including a graduated scale for indicating the weight of a load on said platform, a coil spring for yieldably supporting said platform, a post depending from said platform, an arm pivotally connected at one end to said post and having at its other end a fixed pivotal mounting, a link extending from said arm intermediate its ends and in substantially parallel relation to said post, a lever having one end pivoted to the free end of said link and its other end connected to one end of said coil spring, said lever having a normally fixed pivotal mounting intermediate its ends, a second lever connected at one end to the other end of said spring and having at its opposite end a fixed pivotal mounting, and selectively operable means for connecting or disconnecting said post and said second lever.

4. In a weighing device of the class described, the combination of a platform, means including a graduated scale for indicating the weight of a load on said platform, a coil spring for yieldably supporting said platform, a post depending from said platform, an arm pivotally connected at one end to said post and having at its other end a fixed pivotal mounting, a link extending from said arm intermediate its ends and in substantially parallel relation to said post, a lever having one end pivoted to the free end of said link and its other end connected to one end of said coil spring, said lever having a normally fixed pivotal mounting intermediate its ends, a second lever connected at one end to the other end of said spring and having at its opposite end a fixed pivotal mounting, and selectively operable means for connecting or disconnecting said post and said second lever, comprising a bar connected to said arm for movement in unison therewith but adjustable relative thereto, said bar having means adapted in one position of adjustment to engage a portion of said second lever and in its other position of adjustment to clear said portion.

5. In a weighing device of the class described, the combination of a platform, means including a graduated scale for indicating the weight of a load on said platform, a coil spring for yieldably supporting said platform, a post depending from said platform, an arm pivotally connected at one end to said post and having at its other end a fixed pivotal mounting, a link extending from said arm intermediate its ends and in substantially parallel relation to said post, a lever having one end pivoted to the free end of said link and its other end connected to one end of said coil spring, said lever having a normally fixed pivotal mounting intermediate its ends, said lever being adjustable to vary its length on opposite sides of its pivot, a second lever connected at one end to the other end of said spring and having at its opposite end a fixed pivotal mounting, selectively operable means for connecting or disconnecting said post and said second lever comprising a bar connected to the first mentioned arm for movement in unison therewith but adjustable relative thereto, said bar having means adapted in one position of adjustment to engage a portion of said second lever and in its other position of adjustment to clear said portion.

6. In a weighing device of the class described, the combination of a platform, means including an indicator and a graduated scale for indicating the weight of a load on said platform, a coil spring for yieldably supporting said platform, a post depending from said platform, an arm pivotally connected at one end to said post and having at its other end a fixed pivotal mounting, a link extending from said arm intermediate its ends and in substantially parallel relation to said post, a lever having one end pivoted to the free end of said link and its other end connected to one end of said coil spring, said lever having a normally fixed pivotal mounting intermediate its ends, a second lever connected at one end to the other end of said spring and having at its opposite end a fixed pivotal mounting, manually operable means for connecting or disconnecting said post and said second lever, comprising a bar connected to said arm for movement in unison therewith but adjustable relative thereto, said bar having means adapted in one position of adjustment to engage a portion of said second lever and in its other position of adjustment to clear said portion, and an adjustable stop element for preventing movement of said second lever as an incident to stretching of the spring at its upper end through the agency of said first mentioned lever.

7. In a weighing device of the class described, the combination of a platform, means including a graduated scale for indicating the weight of a load on said platform, a coil spring for yieldably supporting said platform, a post depending from said platform, an arm pivotally connected at one end to said post and having at its other end a fixed pivotal mounting, a link extending from said arm intermediate its ends and in substantially parallel relation to said post, a lever having one end pivoted to the free end of said link and its other end connected to one end of said coil spring, said lever having a normally fixed pivotal mounting intermediate its ends, a second lever connected at one end to the other end of said spring and having at its opposite end a fixed pivotal mounting, selectively operable means for connecting or disconnecting said post and said second lever, comprising a bar connected to said first mentioned arm for movement in unison therewith but adjustable relative thereto, said bar having means adapted in one position of adjustment to engage a portion of said second lever and in its other position of adjustment to clear said portion, an adjustable stop element for preventing movement of said second lever as an incident to stretching of the spring at its upper end through the agency of said first mentioned lever, and means for permitting retraction of the spring to maintain the indicator in the same operative relation to the zero point of the scale in spite of the added leverage of said second lever.

8. In a weighing device of the class described, the combination of a platform, a spring for yieldably supporting said platform, a post depending from said platform, lever means connecting said post to one end of said spring for applying stretching force to said end of the spring as an incident for downward movement of the platform under load, another lever connected to the other end of said spring, disengageable means for connecting said other lever to said post, and means for anchoring one end of the spring to permit stretching thereof by said first mentioned lever means while also permitting stretching of the spring from both ends thereof when said other lever is connected to the post.

9. In a weighing device of the class described, the combination of a platform, a spring for yieldably supporting said platform, a post depending from said platform, lever means connecting said post to one end of said spring for applying stretching force to said end of the spring as an incident to downward movement of the platform under load, another lever connected to the other end of said spring, disengageable means for connecting said other lever to said post, and an adjustable stop means, operable in one position of adjustment to anchor one end of the spring in fixed position to permit stretching thereof by said first mentioned lever, said stop means being arranged, when in another position of adjustment, to permit contraction of the spring to compensate for the leverage added when said other lever is connected to the post to thereby facilitate the weighing of heavy loads.

10. In a weighing device of the class described, the combination of a platform, means including an indicator and a graduated scale for indicating the weight of a load on said platform, a coil spring for yieldably supporting said platform, a post depending from said platform, an arm pivotally connected at one end to said post and having at its other end a fixed pivotal mounting, a link extending from said arm intermediate its ends and in substantially parallel relation to said post, a lever having one end pivoted to the free end of said link and its other end connected to one end of said coil spring, said lever having a normally fixed pivotal mounting intermediate its ends, a second lever connected at one end to the other end of said spring and having at its opposite end a fixed pivotal mounting, manually operable means for connecting or disconnecting said post and said second lever, comprising a bar connected to said arm for movement in unison therewith but adjustable relative thereto, said bar having means adapted in one position of adjustment to engage a portion of said second lever and in its other position of adjustment to clear said portion, and a stop element for preventing upward movement of said second lever as an incident to stretching of the spring at its upper end through the agency of said first mentioned lever.

JOSEPH R. ZWICKL.